United States Patent [19]

Chambers

[11] Patent Number: 5,398,196
[45] Date of Patent: Mar. 14, 1995

[54] METHOD AND APPARATUS FOR DETECTION OF COMPUTER VIRUSES

[76] Inventor: David A. Chambers, 3655 Eastwood Cir., Santa Clara, Calif. 95054

[21] Appl. No.: 99,368

[22] Filed: Jul. 29, 1993

[51] Int. Cl.⁶ ............................................. G06F 15/20
[52] U.S. Cl. .................................. 364/580; 364/550; 364/578; 364/579; 395/500
[58] Field of Search .............. 364/550, 578, 579, 580, 364/286.4; 371/16.2, 19; 395/500

[56] References Cited

U.S. PATENT DOCUMENTS

| | | | |
|---|---|---|---|
| 4,080,650 | 3/1978 | Beckett | 395/500 |
| 4,773,028 | 9/1988 | Tallman | 364/578 X |
| 5,086,502 | 2/1992 | Malcom | 395/575 |
| 5,121,345 | 6/1992 | Lentz | 364/550 |
| 5,144,660 | 9/1992 | Rose | 380/4 |
| 5,233,611 | 8/1993 | Triantafyllos et al. | 371/19 X |

FOREIGN PATENT DOCUMENTS

| | | |
|---|---|---|
| 9006430 | 4/1991 | Brazil . |
| 1057534 | 1/1992 | China . |
| 304033 | 2/1989 | European Pat. Off. . |
| 510244 | 10/1992 | European Pat. Off. . |
| 514815 | 11/1992 | European Pat. Off. . |
| 2629231 | 9/1989 | France . |
| 2632747 | 12/1989 | France . |
| 3736760 | 5/1989 | Germany . |
| 461879 | 4/1990 | Sweden . |
| 2231418 | 11/1990 | United Kingdom . |
| 2246901 | 2/1992 | United Kingdom . |
| 2253511 | 9/1992 | United Kingdom . |
| 9113403 | 9/1991 | WIPO . |
| 9221087 | 11/1992 | WIPO . |

OTHER PUBLICATIONS

Bowen, T., "Central Point Tool Unearths New Viruses," *P.C. Week*, May 31, 1993, pp. 41–42.

Excerpts From On-line Documentation for FProt Program, 1994.

*Primary Examiner*—Edward R. Cosimano
*Attorney, Agent, or Firm*—Townsend and Townsend Khourie and Crew

[57] ABSTRACT

A behavior analyzing antivirus program detects viral infection of a target program by emulating the execution of the target program and analyzing the emulated execution to detect viral behavior. The antivirus monitor program contains both variables corresponding to the CPU's registers and emulation procedures corresponding to the CPU's instructions. The target program is loaded into memory and its execution is emulated by the antivirus monitor program. Intelligent procedures contained in the monitor program are given control between every instruction emulated so as to detect aberrant or dangerous behavior in the target program in which case the danger of a viral presence is flagged and emulation is terminated.

27 Claims, 9 Drawing Sheets

Microfiche Appendix Included
(2 Microfiche, 167 Pages)

METHOD AND APPARATUS FOR DETECTION OF COMPUTER VIRUSES

SOURCE CODE APPENDIX

A microfiche appendix (consisting of 2 sheets and a total of 167 frames) of assembly language source code for a preferred embodiment ((©)1993 David Chambers) is filed herewith. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to a method and apparatus for emulating the execution of a program on a computer system. In particular, the present invention relates to monitoring program behavior to detect and terminate harmful or dangerous behavior in a program. More particularly, the present invention relates to monitoring program behavior to detect computer viruses.

In recent years, the proliferation of "computer viruses" (generally designed by rogue programmers either maliciously or as "pranks") has become an increasingly significant problem for the owners and users of computer systems. True computer viruses vary, but they share the general characteristic that they comprise executable computer code capable of replicating itself by attachment to and modification of standard computer files. Such files are then considered "infected". On most computer systems, viruses are limited to infecting program applications. When the application is executed, the virus can then replicate and attach copies to further application files. Typically, viruses also engage in other forms of behavior that are considered undesirable, such as re-formatting a hard disk.

Often grouped with true computer viruses are some other types of malevolent computer programs: worms and trojan horses. Worms do not infect other applications but merely replicate, either in memory or in other storage media. The harmful effect of worms is generally to reduce system performance. Worms are of concern for large multiuser computer systems, but are generally not of concern for personal computers. Trojan horses are programs that masquerade as useful programs or utilities; they generally run only once and have a harmful effect (such as destroying or damaging the computer system data storage). Trojan horses do not replicate, and after being run once by a user, the user is usually alerted to the harmful behavior and will not run the trojan horse again.

In response to the proliferation of computer viruses, a variety of "antivirus" methodologies and programs have been developed to detect the presence of infected files. These antivirus programs can be generally categorized into groups: behavior interceptors, signature scanners, and checksum monitors.

BEHAVIOR INTERCEPTORS

The earliest antivirus programs were generally of the behavior interceptor type: they would allow a virus program to execute in memory but would intercept strategic operating system function requests made by the computer virus. Such requests would generally be functions which the virus required to be performed in order to replicate or to destroy its host, i.e., "Write to a file", "Erase a file", "Format a disk" etc. By intercepting these requests, the computer operator/user could be informed that a potentially dangerous function was about to be performed. Control could be halted or continued as necessary. Some antivirus programs actually modify the instructions of the discovered virus program and make them inoperable so as to "kill" them.

The behavior interceptor method of virus detection has several drawbacks. The first problem is that it relies entirely on user input and decision making when potentially dangerous behavior is detected. This places a great burden on the user, for it is often very difficult to determine whether the flagged behavior is part of the normal operation of the program being executed. For example, disk optimizing programs routinely reformat hard disks to improve the interleave value. In response to a warning message, a user might suspect that their disk optimizer was infected with a virus (when in fact it was not) and halt program execution. Or, worse yet, if the user knows that such behavior is part of the normal operation of a disk optimizer program, they would likely allow the format to continue uninterrupted, which would be disastrous if the program were actually infected.

A second problem with behavior interceptor antivirus programs is that computer virus technology has advanced to such a state that some computer viruses are able to bypass the interception points used by the antivirus. The virus can then make operating system function requests that are never intercepted by the antivirus, thus avoiding detection.

A third problem with behavior interceptor antivirus programs is that by allowing the virus to execute, the virus has an opportunity to locate and identify the antivirus program in computer memory. Once the antivirus program is located, the virus can modify the antivirus—rendering it completely ineffective in exactly the same manner that antivirus programs locate and modify virus programs to render them ineffective.

A fourth and very significant problem with behavior interceptor antivirus programs is that there are no low level operating system function requests employed by computer viruses that are not also used by any of thousands of nonvirus programs. At an instruction by instruction level, or at a function-call by function-call level, a computer virus performs the same operations as legitimate computer programs. In other words, the closer a computer virus is examined, the less distinguishable it becomes from any other computer program.

SIGNATURE SCANNERS

The next generation of antivirus technology, signature scanners, answered the problem of over-reliance on user interaction as well as the problem of allowing the virus to execute. A signature scanner operates by knowing exactly what a target virus program code looks like ("signature" code) and then scanning for these program codes in any programs requested to be executed or otherwise requested to be scanned. As long as the signature codes were sufficiently long enough so as not to be confused with another program's code, then positive identification was virtually guaranteed and the request to execute could be stopped before execution ever began. The primary problem with this technique is that it requires the antivirus developer to have previously collected and analyzed the target viruses, and included the signature codes in the antivirus program. The antivirus program thus relies on an extensive virus signature library, for there are currently several thousand known IBM PC viruses and several new viruses appear each day. Any new viruses appearing after the antivirus program was developed are not included in the library of program codes for which the antivirus can scan. Signature scanning antivirus programs therefore require frequent updates to keep them current with the increasing number of viruses. If the antivirus developer is lax in providing updates, or the user is lax in obtaining and employing available updates, a signature scanning antivirus program can rapidly lose its effectiveness.

CHECKSUM MONITORS

The last standard technique of virus detection does not look for anything to do with viruses in particular, but concentrates on the host programs which the viruses attack. Every program on a system can be "checksummed" at antivirus installation time. Then, when a virus attaches itself to the unsuspecting host program, the checksum value will (probably) be different and the file infected with the virus can be isolated. The primary problem with this technique is that many programs store varying program information within themselves; this will change the checksum value and thus trigger a false alarm virus detection. Another problem is ensuring the integrity of the checksum information, which is typically attached to the program file itself or stored in a separate file. Both locations are vulnerable to covert virus modification. Once a virus infects a host, it can then update the stored checksum value to correspond to the newly infected file and then execute undetected.

SUMMARY OF THE INVENTION

An improved antivirus program according to a first aspect of the present invention avoids the problems of the prior art and detects viral infection of a target program by emulating the execution of the target program and scanning for viral behavior. By emulating the execution of the target program, viruses are prevented from circumventing the monitor program's protective mechanisms. A second aspect of the present invention recognizes that a key viral behavior is replication: viruses generally operate by passing replication/program-modification code onto uninfected programs. Uninfected programs, on the other hand, do not generally add program-modification code to other programs. According to this aspect of the invention, the emulated target program is tested for replication behavior to determine whether the target program is virus-infected.

A monitor program according to the first aspect of the present invention contains both variables corresponding to the CPU's registers and emulation procedures corresponding to the CPU's instructions. The monitor program includes means for loading a target program into memory and emulating its execution. The monitor program also includes means for analyzing the emulated behavior of the target program and for signalling a warning if the emulated behavior is determined to be aberrant, dangerous or otherwise undesirable.

In one embodiment according to the second aspect of the present invention, the monitor program further includes means, responsive to a file access request by the target program, for providing a dummy program, having known behavior, for modification by the target program. The monitor program also has means for emulating the execution of the modified dummy program after the emulation of the target program is complete. If the modified dummy program is determined to have modified functionality, the original target program is flagged as possessing viral behavior. In one particular embodiment according to this aspect of the invention, a first dummy program is known to not possess the ability to modify another file. If after modification by the target program the first dummy program is emulated and found to modify a second dummy program, then the original target program is flagged as virus infected, for having "infected" the first dummy file with aberrant behavior.

BRIEF DESCRIPTION OF THE DRAWINGS

FIG. 1B is a block diagram illustrating the primary components of a computer system executing a target program according to the present invention.

DESCRIPTION OF THE PREFERRED EMBODIMENT

This description is sufficiently detailed for an understanding of the invention, but for those interested in more details of implementation, a microfiche appendix containing the source code for a particular embodiment is attached. This embodiment is intended for use on IBM PC (or compatible) type computer systems.

Figure 1A:
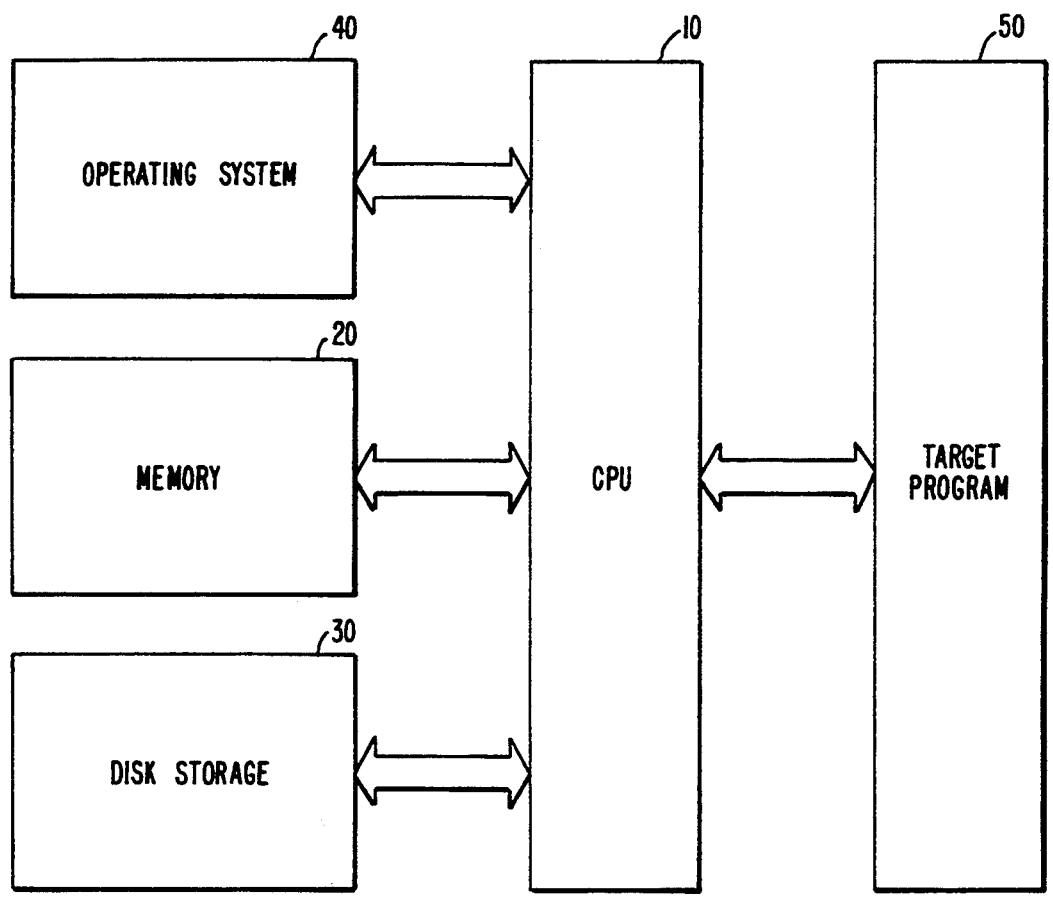
FIG. 1B is a block diagram illustrating the primary components of a computer system executing a target program in a standard manner.

In FIG. 1A a block diagram is shown illustrating the primary components of a computer system executing a target program in a standard manner. The computer system includes a CPU 10, a memory 20, and a disk storage device 30. This is simply an exemplary configuration; the system could of course employ a tape storage device rather than disk storage, and many other variations are possible as well. Operating system 40 typically exists in Read Only Memory, but may also be partially loaded from the disk storage 30 into memory 20. At power up, the CPU begins executing the instructions of operating system 40, which thereafter controls the loading and execution of application programs such as target program 50.

In this standard configuration, if a user selects target program 50 for execution, operating system 40 would load target program 50 from disk storage 30 into memory 20 and then transfer control to target program 50 by loading the start address of target program 50 into the program counter register, or instruction pointer register, of CPU 10. CPU 10 would then begin executing the instructions of target program 50, as pointed to by the instruction pointer register. Target program 50 will typically include calls to operating system routines, which are identified by a table of pointers, commonly known as interrupt vectors. It is by remapping these interrupt vectors that standard behavior interceptor antivirus programs attempt to maintain control and supervision of target programs. As discussed above, however, many computer viruses are able to circumvent this remapping of the interrupt vectors and are able to use operating system routines without being monitored by the antivirus program.

In order to prevent this circumvention of monitoring code, a particular embodiment of the present invention is invoked by a user to request that an application program be analyzed for viral behavior. This embodiment takes the form of a monitor program that emulates the execution of the application for a period of time, monitoring its behavior. By emulating the execution of the application program, the application program can be maintained in a controlled environment that cannot be circumvented by a virus.

Figure 1B:
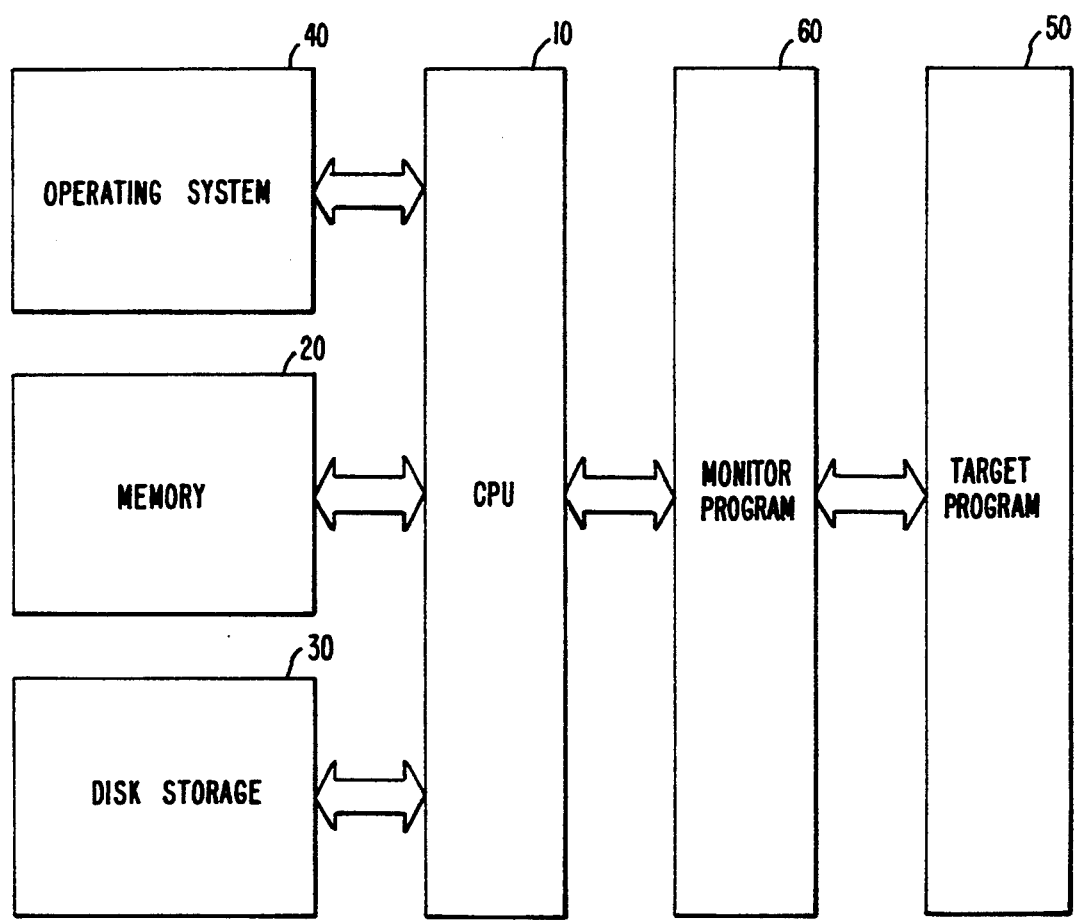

The configuration of the monitor program and target application program is illustrated in FIG. 1B. Monitor program 60 loads target program 50 into memory and emulates the execution of the instructions of target program 50, serving as a protective barrier between the application program and the remainder of the computer system. If the application program has not shown any viral behavior at the end of the monitor period, then it is loaded and executed in the standard manner, such as illustrated in FIG. 1A.

In the secure environment created by the monitor program of FIG. 1B, every aspect of execution can be scrutinized and the operation of the virus can be controlled completely. If the virus were to request a hard disk format operation, a successfully completed status would be returned to it making the virus "believe" that the operation was successful when in fact it was never executed in the first place.

Figures 2A, 2B:
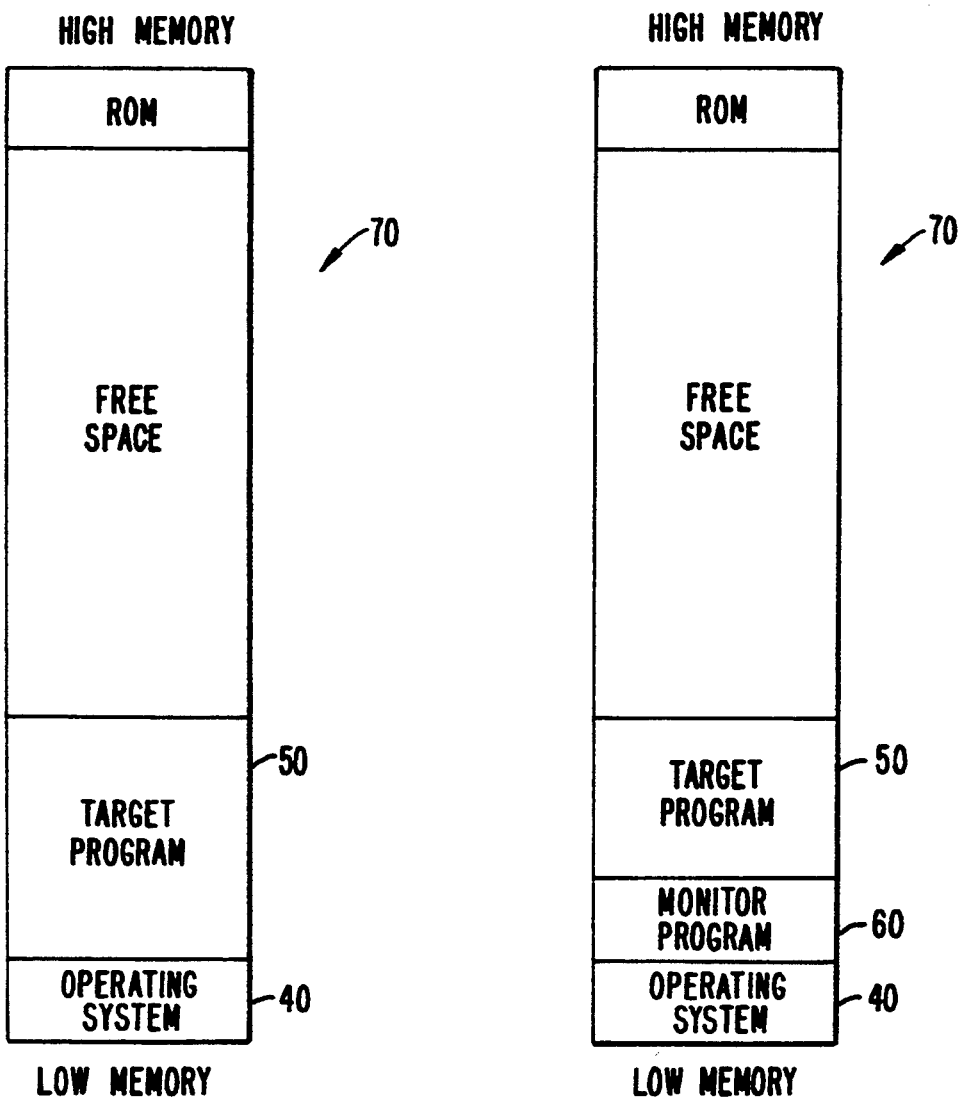
FIGS. 2A and 2B are diagrams illustrating memory maps of the computer systems of FIGS. 1A and 1B, respectively.

FIGS. 2A and 2B respectively show the general layout in memory 70 for an IBM PC type computer system with a target program loaded directly by PC DOS as in FIG. 1A, and for a target program loaded by an embodiment of the present invention as in FIG. 1B. As shown in FIG. 2A, ROM occupies the upper portion of the memory address space with the remainder of memory being filled up from the bottom: first the operating system 40 in lower memory, followed by device drivers and memory resident programs, then user selected programs such as target program 50. FIG. 2B illustrates memory usage as in FIG. 2A, but additionally with monitor program 60 loaded.

Figure 3:
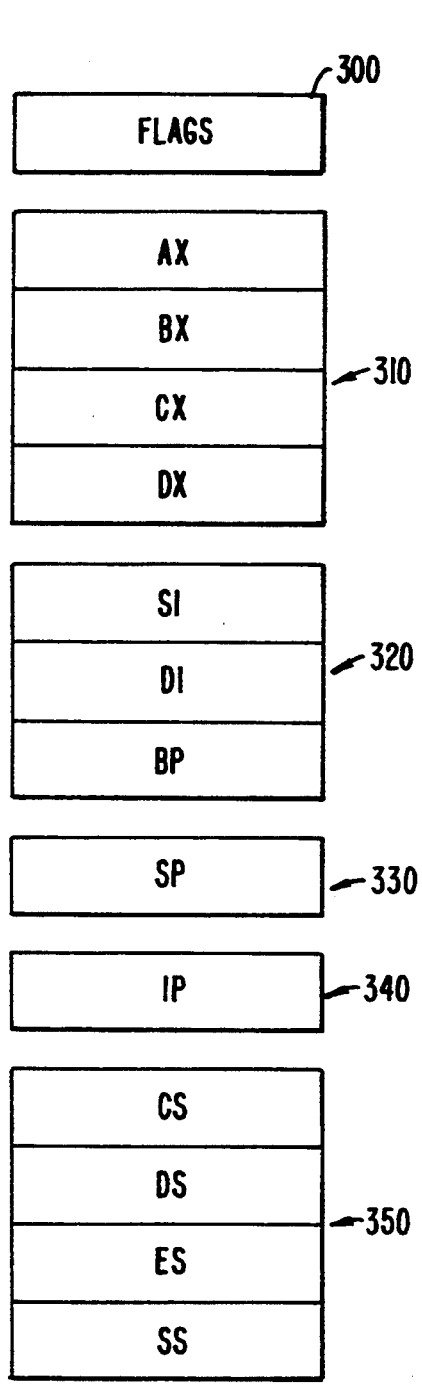
FIG. 3 is a block diagram illustrating the register set emulated by a particular embodiment of the present invention.

FIG. 3 illustrates the various CPU registers employed by an 8086 type CPU, the general type of CPU employed by many personal computers, and for which the presently described preferred embodiment is intended. Flags register 300 is a set of bit-wise flags the may be set or cleared during the execution of various types of instructions. These bits can be examined by other instructions to alter program flow or to perform other tasks. Registers 310 are general purpose and are used for a variety of tasks. Index registers 320 are typically used to indirectly reference memory. Stack pointer 330 is used to maintain a data storage stack in memory. Instruction pointer (program counter) 340 points to the location in memory at which the next instruction to be executed resides. Finally, segment registers 350 are used to prepend and additional 4 bits onto other memory addressing registers (16 bits wide), allowing them to access a broader range of memory. Because these registers are intimately involved in the execution of programs, they are all emulated by the monitor program of the preferred embodiment, so as to fully control the execution of a target program.

Viral Code

Figure 4A:
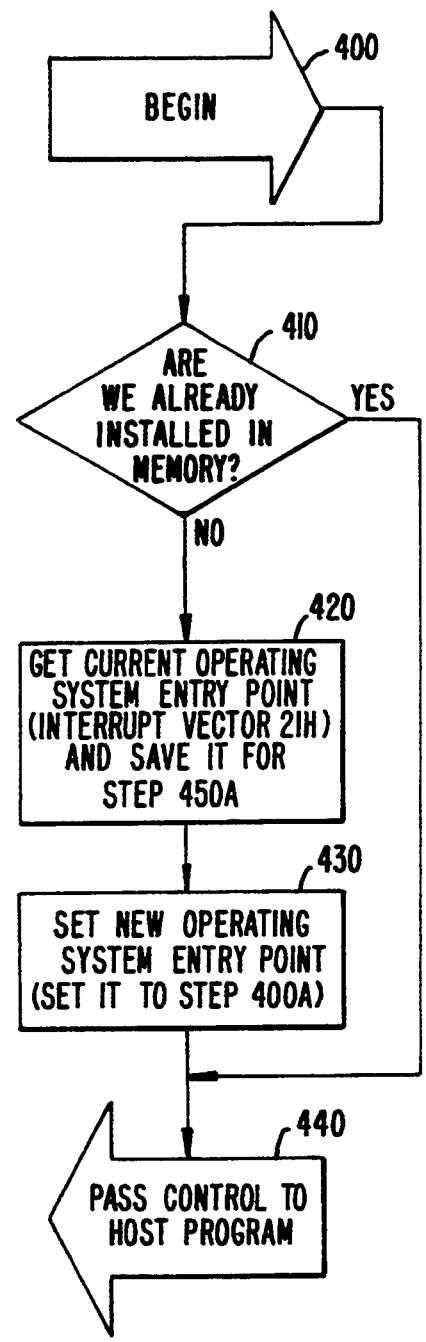
FIGS. 4A and 4B are flowcharts illustrating respectively the installation and replication procedures typically employed by computer viruses.

FIG. 4A illustrates the installation procedure typically employed by computer viruses. The virus execution begins at block 400 and proceeds to block 410, at which the virus determines if a copy of itself has already been installed in memory. If not, execution precedes to block 420, where the virus the current value of interrupt vector 21*h* (the operating system entry point on 8086 type computers), and saves this value for later use. Next, at block 430, the virus sets the entry point to point to a procedure within the virus itself, after which at block 440 control is passed to the host program. If at block 410 the virus had determined that a copy had previously been installed, control would pass immediately to block 440.

Figures 4B, 5:
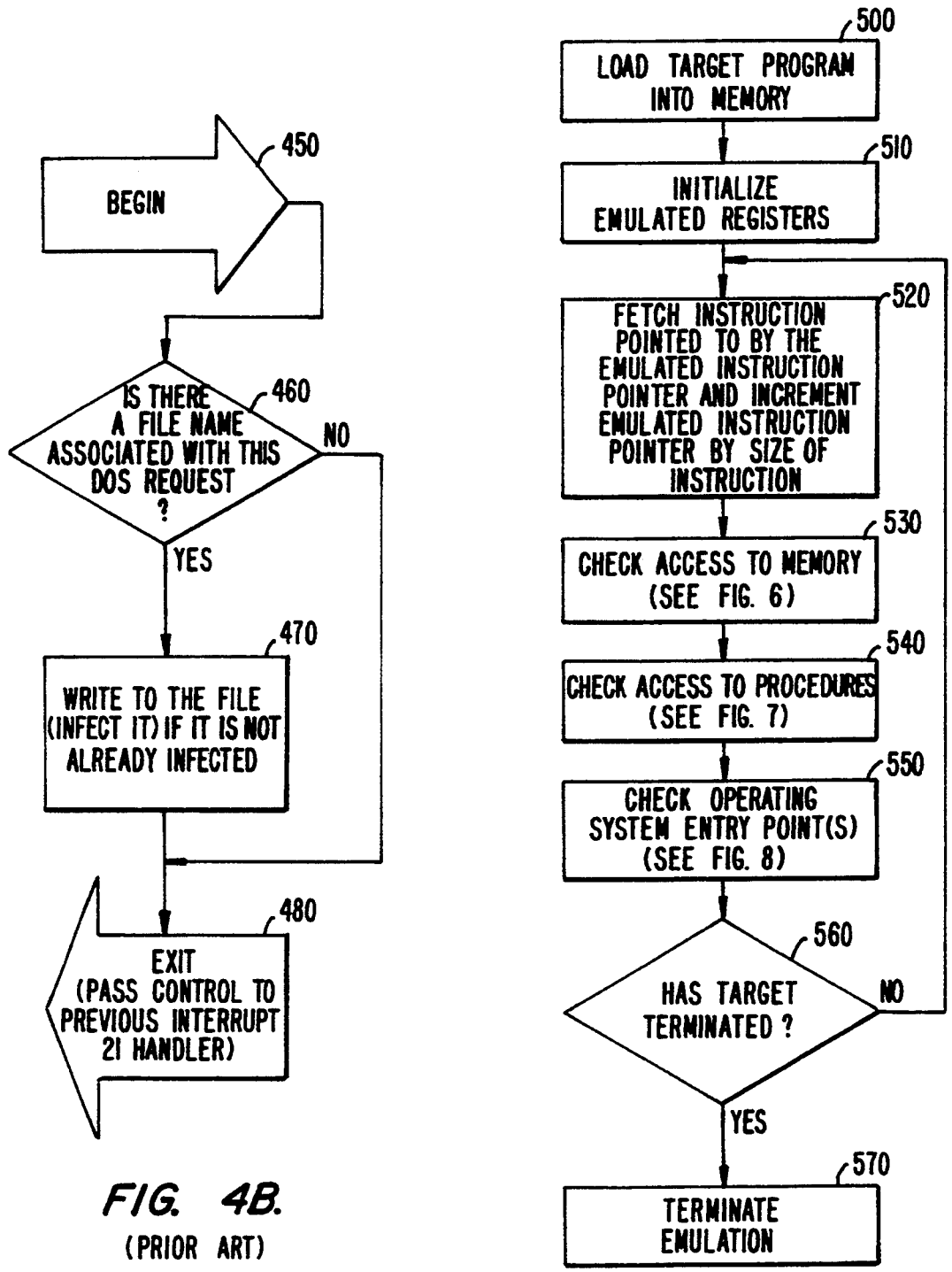
FIG. 5 is a flowchart illustrating the general emulation process performed by a monitor program according to a particular embodiment of the present invention.

FIG. 4B illustrates a typical viral procedure for replication. The beginning of such a procedure would be the replacement entry point stored by the viral code at step 430 of FIG. 4A. When a program later attempts to make an operating system call through int 21, the call would be directed to beginning block 450 of the viral procedure of FIG. 4B. The viral .code would then execute, and at block 460 would determine if there was a file name associated with the operating system call. Such operating system calls are typically used by a normal program to open a file or execute another program. If there was a name associated with the operating system call, then at block 470 the viral code would replicate itself by writing its own executable code to the file that was the subject of the operating system call, in some instances after having checked to ensure that this file was not already infected by the virus. After block 470, the viral code would then exit at block 480, passing control to the original interrupt handler, a pointer to which had been saved at block 420 of FIG. 4A. If at block 460 the viral code had determined that there was no filename associated with the operating system call, then execution would have passed directly from block 460 to block 480. In this manner the operating system continues to function normally except for a slight interruption while the viral code executes.

Emulation to Detect Viral Code

FIG. 5 illustrates the operation of monitor program 60 according to a preferred embodiment of the invention. The monitor program can be executed explicitly by the user with a designated target program, or in alternative embodiments can be executed automatically whenever an operating system call is placed to execute a program. At block 500, the monitor program loads the target program into memory, in exactly the same manner as the operating system would have loaded the target program, but rather than passing execution to the target program immediately, the monitor program retains control for a period of time, to evaluate the target program.

After the target program is loaded at block 500, at block 510 the monitor program initializes the emulated registers, which correspond to the registers used by CPU 10. These register variables are used by a set of instruction emulation routines that are capable of emulating the instructions of CPU 10. The emulated registers are initialized with the same values that the real registers would have had if the target program had been loaded by the operating system for execution.

After the emulation registers are initialized, the main emulation loop is entered. At block 520 the instruction pointed to by the emulated program counter register is fetched by the emulation software and the emulated program counter register is incremented by the size of the fetched instruction, so that it points to the next instruction. Control then proceeds to a set of evaluation procedures for the instruction. At block 530, the monitor program determines if the target program is attempting to access memory selected for controlled access. In the preferred embodiment, operating system procedures and data areas the address range of the monitor program are selected for controlled access. Optionally, any memory not belonging to the target program can be selected for controlled access. The memory access process is explained in more detail below with reference to FIG. 6.

After block 530, at block 540 the monitor program evaluates the instruction for attempted access to a controlled procedure, explained more fully below with reference to FIG. 7, and then also emulates the execution of the instruction. Following block 540 is block 550, at which the monitor program evaluates any possible modifications to the operating system entry points. The processes performed at block 550 are described in more detail below with reference to FIGS. 8–10.

Following the emulation and evaluation blocks 5305–50, at block 560 the monitor code determines if the target application has terminated. If so, emulation is terminated at block 570. The determination of step 560 can be according to whether the target program terminates of its own accord, or the determination can be set by a total number of instructions to be emulated or by a fixed period of time for emulation. If the target program has not terminated of its own accord at step 560, and if the monitor program has not forcibly terminated it, control returns to block 520, where the next cycle of the emulation loop is begun. The emulation termination at block 570 includes some "cleanup" on the part of the monitor program. This includes displaying to the user a status report of all operating system requests performed by the target program. This step may optionally also include reporting any memory accesses that have been performed outside of the area provided for the target program by the monitor program.

Controlling Access to Memory

Figure 6:
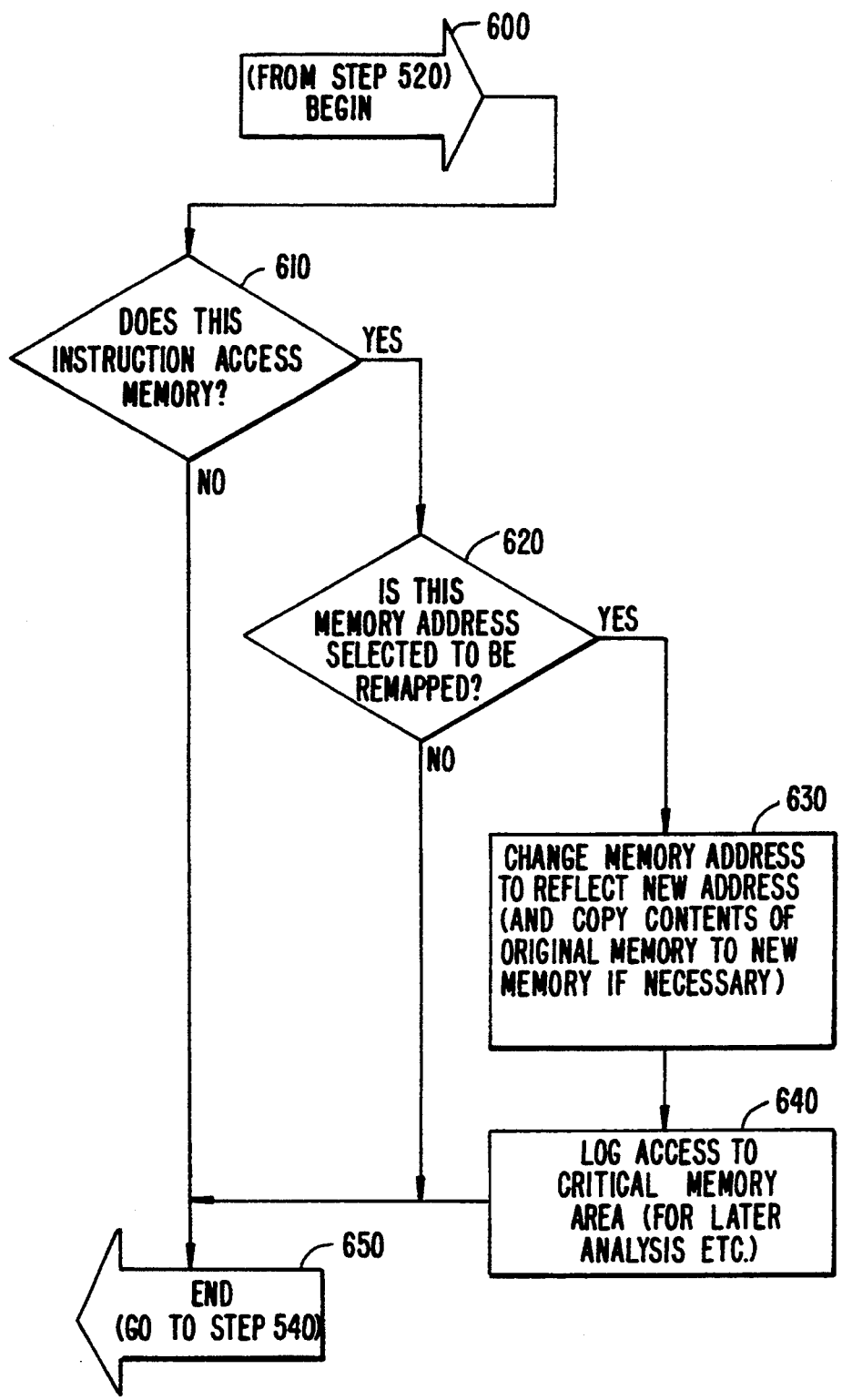
FIG. 6 is a flowchart illustrating in further detail the memory access control step of the flowchart of FIG. 5.

The memory access monitoring process of block 530 is illustrated in further detail in FIG. 6. The described process involves remapping selected parts of memory, which effectively virtualizes those memory areas, making them inaccessible to the target program, and thus protected. In alternative embodiments, access by the target program to these areas of memory is simply denied by the monitor program.

From the starting point at block 600, the procedure passes to block 610, at which the monitor program determines if the current instruction is one whose function is to access memory. If so, then control passes to block 620, where the monitor program determines if the memory location to be accessed by the current instruction is in an area selected for controlled access. If so, then control passes to block 630, which implements a remapping of the memory address. The monitor program's representation of the instruction is modified to point to the mapping destination, so that the original memory location is protected from the target program.

In the preferred embodiment, the contents of the original memory location are copied to the mapping destination the first time the location is accessed by the target program. In other embodiments, the contents of the entire memory area selected for controlled access are copied into the mapping destination area when the monitor program first starts. In yet other embodiments, certain areas selected for controlled access can have their mapping destination areas initialized with null or dummy values. For example, it may be desirable that the content of the monitor program be protected and hidden from the target program, so that a virus cannot detect the presence of the monitor program.

After the remapping of block 630, at block 640 the attempted access to a controlled memory area is logged for later analysis and reporting to the user. After block 640, the memory access control procedure ends at block 650, which returns control to the main process of FIG. 5, at block 540. A negative determination at either of blocks 610 or 620 also results in control passing immediately to block 650.

Controlling Access to Procedures

In some instances, it is desirable to control access to certain procedures. For instance, operating system procedures, ROM procedures, and interrupt handling procedures can have powerful effects and can be subject to misuse by a virus. For these reasons, it is desirable to control access to them and substitute special purpose procedures in their place, to encapsulate viral code within the emulated environment.

Figure 7:
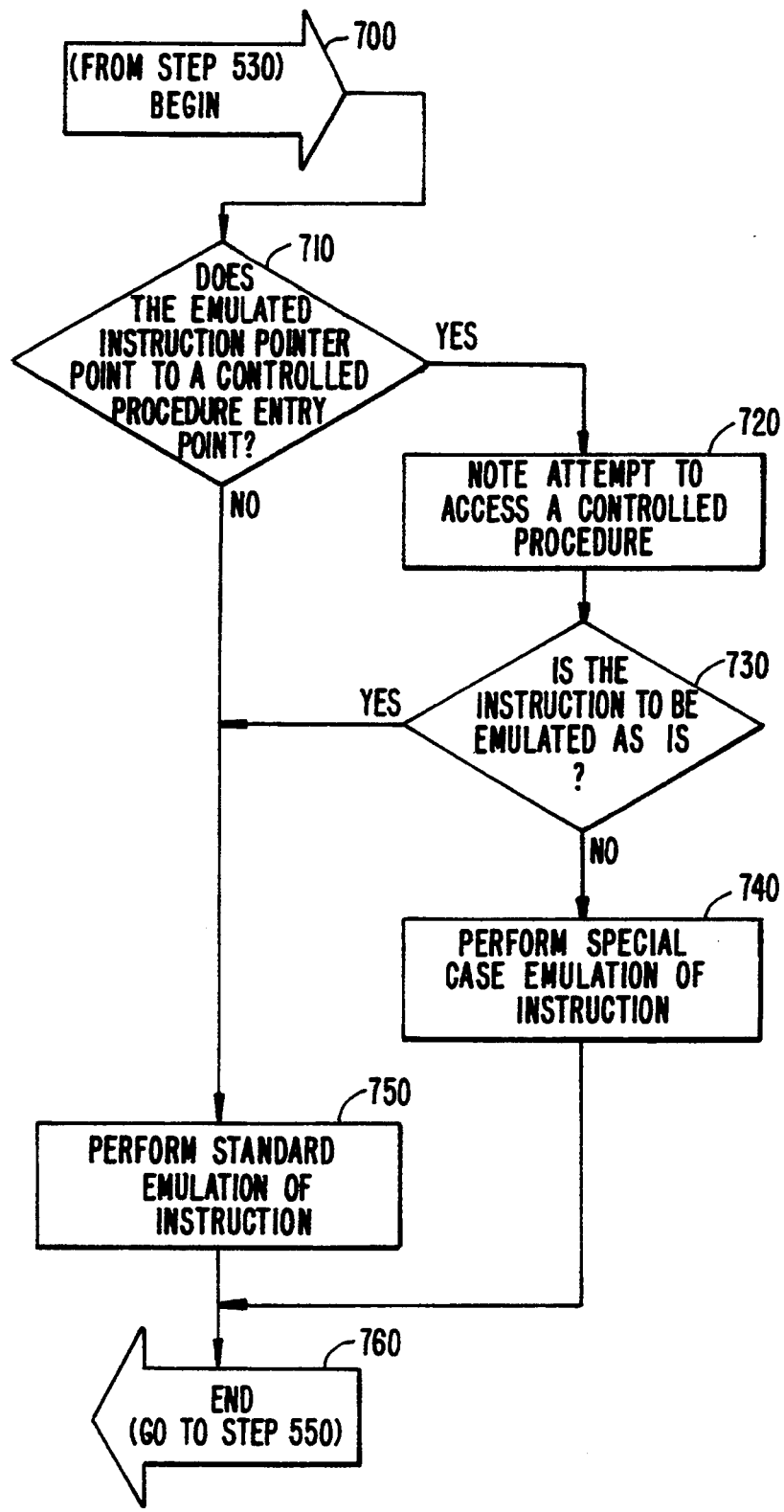
FIG. 7 is a flowchart illustrating in further detail the procedure access control step of the flowchart of FIG. 5.

After the memory access control procedure of block 530 of FIG. 5, control passes to block 540, which is illustrated in further detail in FIG. 7. From beginning block 700 control passes to block 710, at which the monitor program determines if the emulated program counter points to a controlled procedure entry point; a list of such entry points is maintained by the monitor program. If so, then at block 720 the attempted access to a controlled procedure is noted. This can be by displaying a message to the user on the screen, writing to a log file, etc.

Next, at block 730 the monitor program determines if the instruction is to be directly emulated. This determination is made according to information stored for each controlled procedure entry point; for certain such procedures a special case emulation may be desired rather than directly emulating the instructions of the procedure. If the procedure is not to be directly emulated, then control passes to block 740, where a special case emulation of the entry point instruction is performed. In some instances this special case emulation will entail emulation of the entire controlled procedure at this point.

If at block 730 it were determined that the controlled procedure was to be directly emulated, or if at block 710 it were determined that the emulated instruction pointer did not indicate a controlled procedure entry point, then control would pass to block 750, where the instruction indicated by the emulated instruction pointer is emulated in the same manner as other instructions. Following the emulation according to either of blocks 740 or 750, control passes to block 760, which returns execution to the main process of FIG. 5

Controlling Access to Operating System Entry Points

Figure 8:
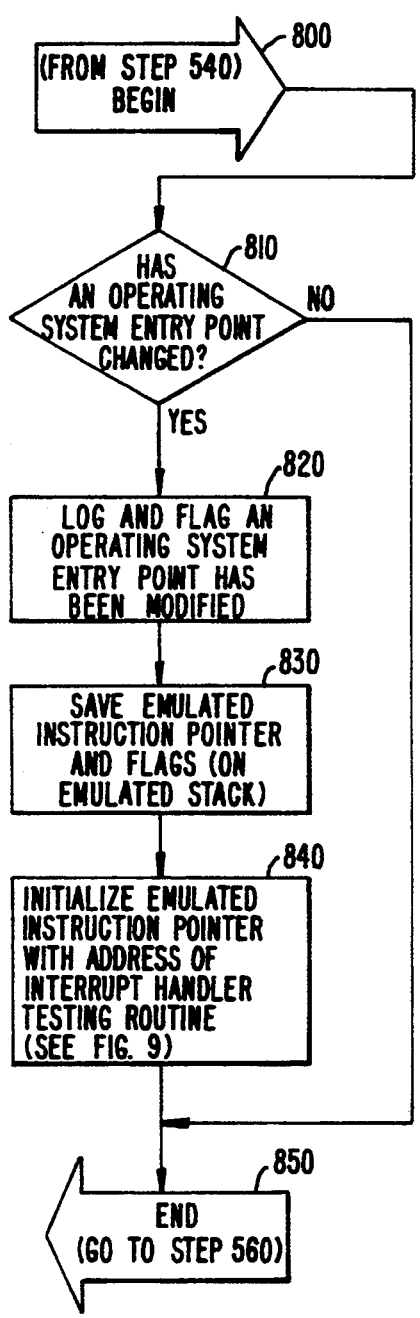
FIG. 8 is a flowchart illustrating in further detail the operating system entry point monitoring step of the flowchart of FIG. 5.

Block 550 is illustrated in further detail by FIG. 8. This control of operating system entry points need not be performed to obtain substantial benefits from the emulation of the target program; however, this process does a higher level of control over the target program and also allows for a more accurate evaluation of viral behavior on the part of the target program.

From beginning block 800 control passes to block 810, at which the monitor program examines a list of operating system entry points to determine if any have changed as a result of the instruction just emulated. This would indicate that the target program had replaced an interrupt handler with a routine of its own. If there is such a change, then it is logged at block 820. At block 820 a flag is also preferable set to indicate that the entry point has changed, so that the change will not be logged redundantly later. In some embodiments, the flag indicates the new value of the entry point, so the monitor program can determine if the entry point gets modified yet again.

After block 820, at block 830 the emulated instruction pointer, emulated code segment register, and emulated flag register are saved onto the emulated stack. Then the emulated stack pointer is decremented the corresponding 6 bytes, in the same manner as if a hardware interrupt had been received. Next, at block 840, the emulated code segment register and emulated instruction pointer are set to a special purpose monitor program routine to test the interrupt handler just installed by the target program. This interrupt handler testing routine is described below with reference to FIG. 9.

After block 840, execution passes to block 850, which returns control to the basic process of FIG. 5. This causes the interrupt handler routine of FIG. 9 to be emulated in the same step by step manner as the target program. This maintains the highest degree of encapsulation around the target program, although if detecting viral replication is essentially the only concern, the interrupt handler testing routine of FIG. 9 may alternatively be executed in a more straightforward emulation without many of the execution safeguards described above.

If at block 810 the monitor program had determined that no operating system entry points had been changed, then control would have passed directly to block 850, and thus returned to the process of FIG. 5 to emulate the remainder of the target program.

Interrupt Handler Testing

The basic tack of the interrupt handler testing routine is to offer up a guinea pig file for "sacrifice" to a potential viral interrupt handler, and then test the guinea pig file for corruption. This requires that a "clean" guinea pig file already be at hand and also be disposable. This can be easily provided for by several methods, such as by creating the guinea pig file or copying the guinea pig file from a clean library copy at the very start of the monitor program. The guinea pig file should have a known content. It is preferably executable, but without its execution involving writing to other files. The guinea pig file can thus be essentially a null file that does nothing when executed, simply returning immediately.

Figure 9:
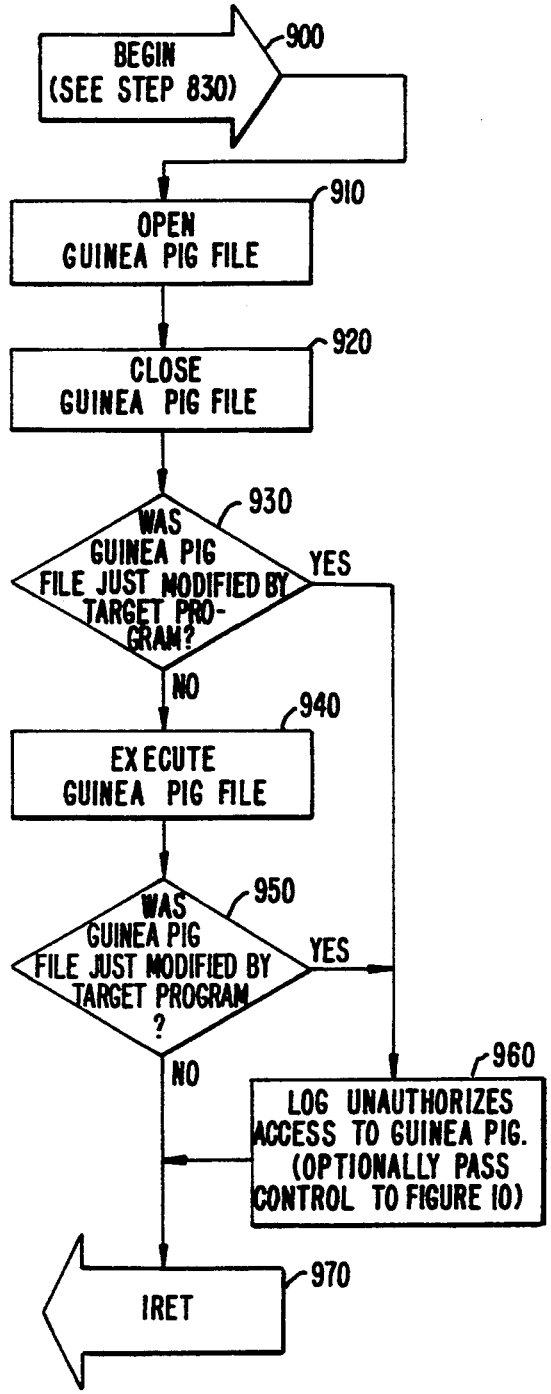
FIG. 9 is a flowchart illustrating the process performed by a particular embodiment of the present invention to check the behavior of an interrupt handler.

As shown in FIG. 9, when the interrupt handler routine is entered at block 900, the first action is to open the guinea pig file, at block 910, after which the guinea pig file is closed at block 920. Next, at block 930 the interrupt handler testing routine examines the guinea pig file to determine if its content has been changed. Such would be the result of a virus having contaminated the interrupt handlers for opening or closing files. If a change is not detected at block 930, then at block 940 the guinea pig file is executed, after which at block 950 the guinea pig file is again examined by the interrupt handler testing routine to determine if its content has been changed by the execution interrupt handler.

If a positive determination had been made at either of blocks 930 or 950, then execution would pass from the respective block to block 960, at which the unauthorized access to the guinea pig file would be logged. After block 960, and also after a negative determination at block 950, execution passes to block 970, which executes an (emulated) IRET instruction. This is a return from interrupt instruction, which causes the values placed onto the emulated stack at block 830 of FIG. 8 to be restored to the emulated registers. This completes the interrupt handler testing, and returns the emulation to its last point of emulation in the target program.

Figure 10:
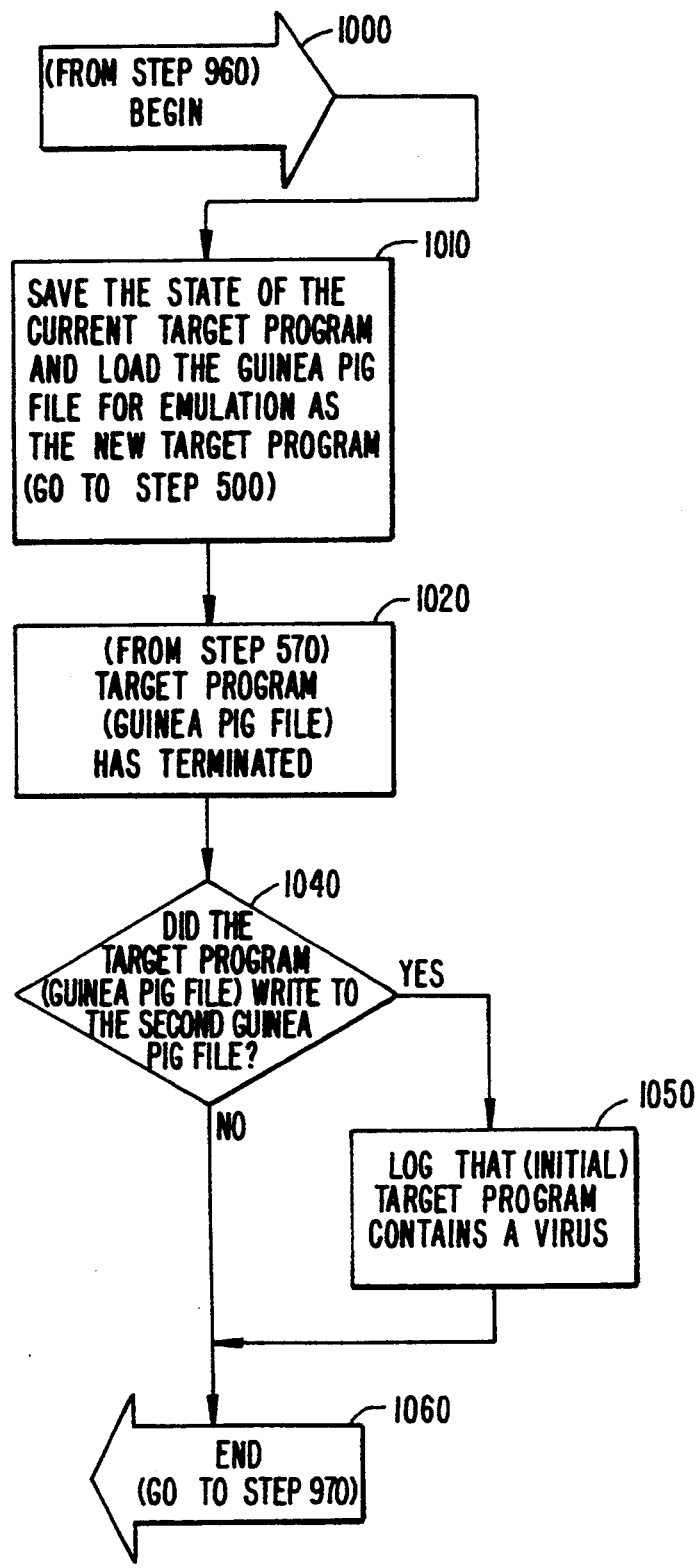
FIG. 10 is a flowchart illustrating the process performed by a particular embodiment of the present invention to identify viral replication behavior.

For a more refined and definitive degree of analysis, block 960 can also initiate a routine to determine not just if the guinea pig was contaminated, but if it was contaminated in a way so as to contaminate other files; i.e., if it was infected with viral replication behavior. Such a routine is illustrated in FIG. 10. The process of FIG. 10 essentially creates a completely new emulation, with the modified guinea pig file serving as the target program. If this first guinea pig file now passes modification behavior on to a second guinea pig file, then the original target program has been shown to be contaminated with viral code having replicative behavior. To prevent needless additional recursion, the second level of emulation should be identified as such, through use of a flag, etc., so that if block 960 is reached during the second level of emulation, viral behavior is confirmed and the second level of emulation is terminated (rather than beginning another level of testing with yet another guinea pig file).

This replication detection process is illustrated in FIG. 10. After beginning at block 1000, at block 1010 the complete state of the current emulation is saved, and all operating system entry points, etc., are returned to their values at the beginning of the first emulation. Block 1010 also then includes the step of initiating emulation again, but with the guinea pig file specified as the target program. As noted above, this emulation level should be flagged as a second level emulation.

Block 1020 indicates the point at which the emulation of the guinea pig file has terminated, after which at block 1040 the first level emulation determines if the emulated guinea pig file had written to a second guinea pig file. This determination is most straightforward if a flag is simply passed from the second level emulation back to the first; it can also be by examining a checksum for the file. If the determination at block 1040 is positive, then at block 1050 the initial target program is confirmed and logged as being virus-contaminated. contaminated. After either a negative determination at block 1040 or execution of block 1050, execution proceeds to block 1060. At block 1060 at the end of the process of FIG. 10, control is passed back to block 970 of FIG. 9, to continue emulation of the initial target program. Alternatively, reaching block 1050 can result in the entire emulation being terminated, as the target program has been confirmed as being virus-contaminated.

Source Code Appendix

The embodiment of the source code appendix is intended for use on IBM PC type computer systems. The source code is in the form of a number of 80×86 assembly language files that must be compiled and then linked in the order VPROBE, CPU, PROT, VECTORS, DIAG, DEBUG, THEEND. The resultant executable file can then be executed with a program name, passed as a command line parameter, to serve as a target program for virus detection.

Alternative Embodiments

Rather than requiring the user to load the monitor program which then loads the target program, a "zero length loader" TSR version could be installed in a system and every program requested to be executed could be emulated. If no abnormal behavior is found in the first 'n' instructions, the monitor program could pass control to the CPU to allow the target to execute at "full speed" and the end user would not have to be aware of the existence of the monitor program (other than a slight delay during the initial execution).

Another alternative approach would be where a recursive parser/emulator could effectively evaluate every single instruction of executable code in a program by noting the address of conditional branch instructions, and returning to that branch location, restoring the cpu/memory state of the machine at that instant, and continuing emulation as if the branch had taken the alternate route instead. Emulation continues until all instructions have been evaluated. This would be a time consuming process; however, the information revealed would definitively answer the question of whether the original code was virus infected.

It is also important to note that, although the described embodiment is oriented towards identifying viral behavior, the disclosed emulation techniques can be constructively employed to emulate program execution in all types of situations where potentially destructive or other predetermined program behavior is a concern.

It is to be understood that the above description is intended to be illustrative and not restrictive. Many other embodiments will be apparent to those of skill in the art upon reviewing the above description. For instance, the instructions of the emulated application program could be read directly from disk storage rather than being loaded into memory first. The scope of the invention should, therefore, be determined with reference to the appended claims, along with the full scope of equivalents to which such claims are entitled.

What is claimed is:

1. A computer system configured to monitor the execution of a target program intended to run on a target computer, said target computer having an instruction set, said computer system comprising:
   a processing unit;
   instruction emulation means for operating said processing unit to emulate instructions in said target program corresponding to said instruction set as if said instructions were running on said target computer;
   monitor means, coupled to said instruction emulation means, for emulating execution of said target program as if said target program were running on said target computer and for monitoring said emulated target program execution to detect a predetermined behavior by said target program; and
   means, coupled to said monitor means, for logging said predetermined behavior when detected.

2. The computer system of claim 1, wherein said computer system is configured to detect viral activity associated with said target program, wherein said predetermined behavior is chosen to be indicative of effects of said viral activity.

3. The computer system of claim 1 wherein said instruction emulation means comprises:
   a register emulator for emulating registers of said target computer; and
   a procedure controller for substituting emulation procedures for procedures accessed by said target program during emulation.

4. The computer system of claim 1 wherein said instruction emulation means comprises:
   a memory access controller for controlling access by said instructions to memory.

5. The computer system of claim 1 wherein said target computer is said computer system.

6. In a computer system, a method for monitoring execution of a target program intended to run on a target computer comprising the steps of:
   emulating the target program as if it were running on said target computer; and
   monitoring emulation of the target program to detect a predetermined behavior indicating presence of a computer virus.

7. The method of claim 6 wherein said target computer is said computer system.

8. In a computer system including a processing unit and a viral behavior monitor, a method for monitoring execution of a target program intended to run on a target computer comprising the steps of:
   using said processing unit to emulate execution of an instruction as if said instruction were running on said target computer;
   using said viral behavior monitor to control access by said instruction to memory;
   using said viral behavior monitor to control access by said instruction to procedures; and
   repeating said step of using said processing unit for successive instructions of the target program.

9. The method of claim 8 wherein said step of using said viral behavior monitor to control access by the instruction to memory comprises the substeps of:
   substituting an alternative memory address for a memory address to which the instruction intends access and which has been preselected for controlled access; and
   logging an attempted access to the memory address to which the instruction intends access.

10. The method of claim 8 wherein said target computer is said computer system.

11. The method of claim 8 wherein said step of using said vital behavior monitor to control access by the instruction to procedures comprises the substep of:

upon a determination that the instruction is located at a controlled procedure entry point, logging an access attempt to the controlled procedure entry point.

12. The method of claim 11 wherein said step of using said viral behavior monitor to control access by the instruction to procedures further comprises the substeps of:
    upon a determination that the controlled procedure entry point belongs to a special case list, performing a special case emulation of the instruction; and
    upon a determination that the controlled procedure entry point does not belong to a special case list, performing a standard emulation of the instruction.

13. The method of claim 12 wherein said step of performing a special case emulation of the instruction comprises substituting an alternate procedure for the procedure which begins at the controlled procedure entry point.

14. The method of claim 8 further comprising the step of:
    using said viral behavior monitor to control access by the instruction to operating system access points.

15. The method of claim 14 wherein said step of using said vital behavior monitor to control access by the instruction to operating system access points comprises the substep of:
    upon a determination that an operating system entry point has changed, logging an operating system entry point change.

16. The method of claim 15 wherein said step of using said viral behavior monitor to control access by the instruction to operating system access points further comprises the substeps of:
    opening a guinea pig file;
    closing the guinea pig file;
    examining the guinea pig file to check if contents of the guinea pig file have changed; and
    upon a determination that contents of the guinea pig file have changed, logging unauthorized access to the guinea pig file.

17. The method of claim 15 wherein said step of using said viral behavior monitor to control access by the instruction to operating system access points comprises the substeps of:
    executing a guinea pig file;
    examining the guinea pig file to check if contents of the guinea pig file have changed; and
    upon a determination that contents of the guinea pig file have changed, logging unauthorized access to the guinea pig file.

18. The method of claim 16 wherein said step of using said viral behavior monitor to control access to operating system entry points further comprises the substeps of:
    upon a determination that contents of the guinea pig file have changed, loading the guinea pig file for emulation as a new target program and proceeding through said steps of emulating execution and controlling access to operating system entry points, thereby creating a second guinea pig file; and
    upon a determination that the new target program has written to the second guinea pig file, logging a virus.

19. The method of claim 17 wherein said step of using said viral behavior monitor to control access to operating system entry points further comprises the substeps of:
    upon a determination that contents of the guinea pig file have changed, loading the guinea pig file for emulation as a new target program and proceeding through said steps of emulating execution and controlling access to operating system entry points, thereby creating a second guinea pig file; and
    upon a determination that the new target program has written to the second guinea pig file, logging a replicative virus.

20. A computer system configured to monitor the execution of a target program intended to run on a target computer, said target computer having an instruction set, said computer system comprising:
    a processing unit;
    an instruction emulator for operating said processing unit to emulate instructions corresponding to the instruction set as if said instructions were executed by said target computer;
    an entry point access controller for controlling access to operating system entry points; and
    a logger for logging improper access by said instructions to operating system entry points.

21. The computer system of claim 20 further comprising a procedure access controller for controlling access to procedures during instruction emulation, wherein said logger logs improper access by said instructions to procedures.

22. The computer system of claim 20 further comprising a memory access controller for controlling access by said instructions to memory during instruction emulation wherein said logger logs improper access by said instructions to memory.

23. The computer system of claim 20 wherein said target computer is said computer system.

24. The computer system of claim 20 wherein said entry point access controller checks if a viral interrupt has been installed.

25. The computer system of claim 24 wherein said entry point access controller opens and closes a guinea pig file and tests for modification of the guinea pig file to determine if a viral interrupt has been installed.

26. The computer system of claim 24 wherein said entry point access controller executes a guinea pig file and tests for modification of the guinea pig file to determine if a viral interrupt has been installed.

27. The computer system of claim 26 wherein said entry point access controller executes the guinea pig file as a new target program, thereby creating a second guinea pig file, and tests for modification of the second guinea pig file to determine if a replicative viral interrupt has been installed.

* * * * *